(12) United States Patent
Cheah et al.

(10) Patent No.: US 8,305,343 B2
(45) Date of Patent: Nov. 6, 2012

(54) COMPUTER POINTING DEVICE WITH MOTION-DRIVEN ELECTROMAGNETIC INDUCTION MODULE

(75) Inventors: Chiang-Sun Cheah, Penang (MY); Chin-Heong Yeoh, Bukit Mertajam Penang (MY); Siew-Siar Boon, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 2519 days.

(21) Appl. No.: 10/955,514

(22) Filed: Sep. 30, 2004

(65) Prior Publication Data

US 2006/0066568 A1 Mar. 30, 2006

(51) Int. Cl.
*G09G 5/00* (2006.01)
(52) U.S. Cl. ........................................................ 345/156
(58) Field of Classification Search ........... 345/156–184
See application file for complete search history.

(56) References Cited

U.S. PATENT DOCUMENTS

| | | | |
|---|---|---|---|
| 5,644,108 A | 7/1997 | Katsurahira et al. | |
| 5,838,138 A | 11/1998 | Henty | |
| 6,476,799 B1 | 11/2002 | Lee et al. | |
| 6,633,155 B1 | 10/2003 | Liang | |
| 6,661,410 B2 | 12/2003 | Casebolt et al. | |
| 6,781,570 B1 | 8/2004 | Arrigo et al. | |
| 2002/0118173 A1 | 8/2002 | Nacson | |
| 2002/0180690 A1* | 12/2002 | Swamy | 345/156 |
| 2004/0145567 A1 | 7/2004 | Ho | |

FOREIGN PATENT DOCUMENTS

| | | |
|---|---|---|
| GB | 2314470 | 12/1997 |
| JP | 1-114334 | 5/1989 |
| JP | 4-197041 | 7/1992 |
| JP | 04197041 A * | 7/1992 |
| JP | 7-225649 | 8/1995 |
| JP | 10-283079 | 10/1998 |

* cited by examiner

*Primary Examiner* — Amare Mengistu
*Assistant Examiner* — Jennifer Zubajlo

(57) ABSTRACT

In one embodiment, a computer pointing device is provided with a navigation module, an electronic control system, and a motion-driven electromagnetic induction module. The electronic control system serves to activate and deactivate the navigation module. At times, the control system enters a sleep mode and deactivates the navigation module. In response to movement of the computer pointing device, the motion-driven electromagnetic induction module generates an output signal that wakes the control system and activates the navigation module. In another embodiment, a computer pointing device is provided with a housing, a battery, and a motion-driven electromagnetic induction module. The electromagnetic induction module is coupled to the battery, is enclosed within the housing, and is unconnected to any externally manipulable portion of the computer pointing device. Movement of the computer pointing device causes the electromagnetic induction module to charge the battery.

13 Claims, 2 Drawing Sheets

COMPUTER POINTING DEVICE WITH MOTION-DRIVEN ELECTROMAGNETIC INDUCTION MODULE

BACKGROUND

Computer pointing devices (CPDS) may take various forms, including that of a mouse, pen or trackball. Some CPDs are powered by batteries or are connected to other devices (e.g., portable computers) that are powered by batteries. As a result, it is often desirable to minimize the power consumption of these CPDs, or to provide a convenient means for recharging these CPDs.

SUMMARY OF THE INVENTION

In one embodiment, a computer pointing device comprises a navigation module, an electronic control system, and a motion-driven electromagnetic induction module. The electronic control system serves to activate and deactivate the navigation module. At times, the control system enters a sleep mode and deactivates the navigation module. In response to movement of the computer pointing device, the motion-driven electromagnetic induction module generates an output signal that wakes the control system and activates the navigation module.

In another embodiment, a computer pointing device comprises a housing, a battery, and a motion-driven electromagnetic induction module. The electromagnetic induction module is coupled to the battery, is enclosed within the housing, and is unconnected to any externally manipulable portion of the computer pointing device. Movement of the computer pointing device causes the electromagnetic induction module to charge the battery.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
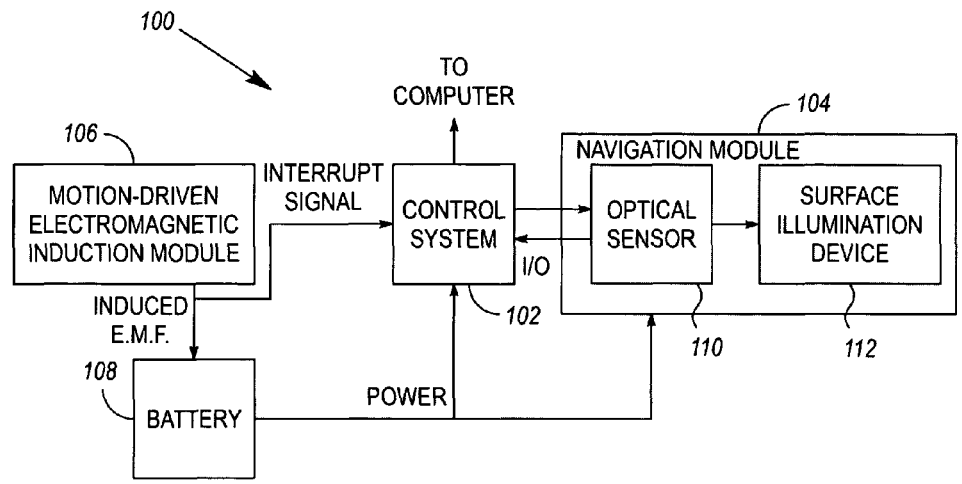
FIG. 1 provides a block diagram of an exemplary computer pointing device (CPD)

FIG. 1 provides a block diagram of an exemplary computer pointing device (CPD) 100. By way of example, the CPD 100 could take the form of a mouse, pen or trackball.

The CPD 100 comprises an electronic control system 102, a navigation module 104, a motion-driven electromagnetic induction module 106, and an optional battery 108. In use, the navigation module 104 acquires data from which movements of the CPD 100 (e.g., changes in CPD position or direction of CPD movement) may be determined. In one embodiment, the navigation module 104 may be an optical navigation module, such as the ADNS-2051 High-Performance Optical Mouse Sensor marketed by Agilent Technologies, Inc. In an optical navigation module, an optical sensor 110 such as a charge coupled device (CCD) or complimentary metal-oxide semiconductor (CMOS) sensor acquires a series of pictures of a surface over which it is moved. The optical navigation module then compares and pattern matches consecutive ones of the pictures to determine how the CPD 100 has moved. If the navigation module 104 is an optical one, it may also comprise a surface illumination device 112 (e.g., a light emitting diode (LED) or laser diode) to illuminate the surface being sensed by its optical sensor 110. The sensed surface may be a desk, a mouse pad, the surface of a trackball, or any other random surface over which the navigation module of the CPD 100 is moved.

The control system 102 and navigation module 104 both require power to perform their respective functions. As shown in FIG. 1, this power may be derived from the CPD's own battery 108. In this manner, the CPD 100 may operate as a wireless device. Alternately, the CPD 100 may be powered by an external power source, such as a computer to which the CPD 100 is connected via a universal serial bus (USB). The computer, in turn, may derive its power from an internal battery, or an external direct current (DC) or alternating current (AC) power source.

If the CPD 100 receives its power from a battery (e.g., either its own battery 108, or that of a computer to which it is attached), use of the CPD 100 subjects the battery 108 to a current draw which tends to discharge the battery 108. If the rate of battery discharge is significant, the CPD's user may become dissatisfied with the CPD 100 (or, when making an initial purchase decision, a consumer may choose not to purchase the CPD 100). The control system 102 may therefore serve to activate and deactivate the navigation module 104. One way in which the control system 102 may activate and deactivate the navigation module 104 is on a periodic basis. In this manner, the navigation module 104 can be periodically activated to check for CPD movement and, absent movement, the navigation module 104 can be deactivated until a next periodic activation. Another way in which the control system 102 may deactivate the navigation module 104 is by entering a sleep mode. The sleep mode may apply to activity of the control system 102 as a whole, or only to those portions of the control system 102 that activate and deactivate the navigation module 104. The sleep mode of the control system 102 may be entered, for example, whenever the CPD 100 is not moving, or when the control system 102 determines that the CPD 100 has not been moved for a predetermined amount of time. In some cases, the control system 102 may use both of these methods, as well as others, to activate and deactivate the navigation module 104 and thereby conserve battery power.

In one embodiment, the motion-driven electromagnetic induction module 106 provides a means for waking the control system 102 of the CPD 100 (or at least that part of the control system that serves to activate and deactivate the navigation module 104. By way of example, the electromagnetic induction module 106 may wake the control system 102 by generating an output signal provided to a "wake-up" or "interrupt" input of a microcontroller (e.g., control system 102). That is, in response to movement of the CPD 100, the electromagnetic induction module 106 generates an output signal that wakes the control system 102 and activates the CPD's navigation module 104. In another embodiment, the electromagnetic induction module 106 additionally (or alternately) provides a means for charging the CPD's battery 108.

Figure 2:
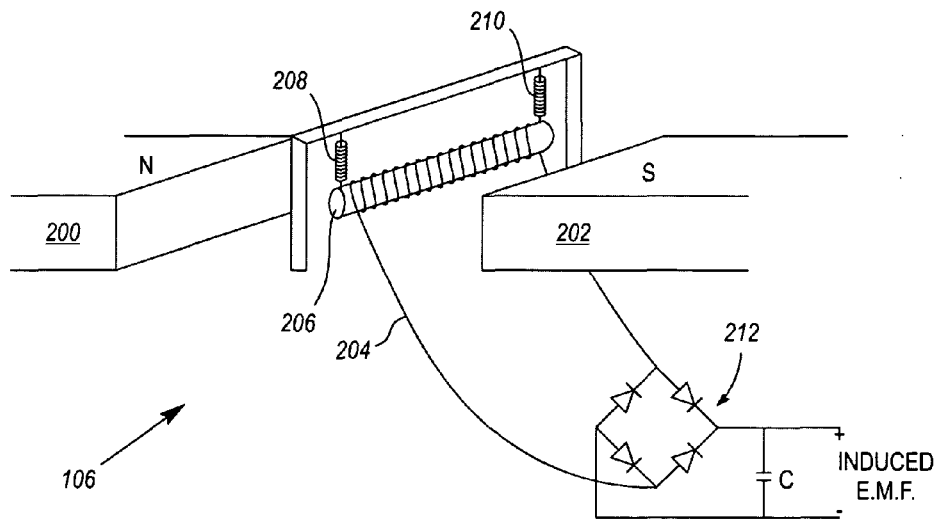
FIG. 2 illustrates an exemplary embodiment of the motion-driven electromagnetic induction module that forms part of the FIG. 1 CPD.

As shown in FIG. 2, the electromagnetic induction module 106 may comprise a number of permanent magnets that form a magnetic field. In FIG. 2, the pertinent magnetic field is created between two adjacent magnets 200, 202. The module 106 further comprises a conductor 204 that is positioned within the magnetic field. In FIG. 2, the conductor 204 takes the form of a wire that is coiled about a suspended rod 206. By way of example, the rod 206 may be suspended via one or more springs 208, 210. Preferably, the spring(s) 208, 210 provide a weak stabilizing force to the rod 206, such that low-amplitude background vibrations (or noise) in a CPD's environment will not trigger movement of the rod 206; yet small, purposeful movements of the CPD 100 readily move the rod 206 (e.g., swing, bounce or rotate it).

In alternate embodiments of the motion-driven electromagnetic induction module 206, the magnet(s) 200, 202 and conductor 204 are mounted in other ways that provide relative movement therebetween during movement of the CPD 100 in which they are mounted. For example, the conductor 204 itself may formed as a clock spring or weakly-biased leaf spring. Or, the conductor 204 could be attached to a pendant mass that is suspended via a gyroscope or other pendulum movement. Alternately, the conductor's position could be fixed, and one or more of the magnets 200, 202 forming the magnetic field could be mounted to swing, slide or rotate during movement of the CPD 100.

In any of the above-described embodiments of the electromagnetic induction module 106, the magnetic field experienced by the conductor 204 is subject to change; and, according to Faraday's Law, a change in the magnetic environment of a coiled conductor 204 induces an electromotive force (i.e., an e.m.f. or voltage) in the conductor 204. The induced e.m.f. may be variously expressed as:

$$\begin{aligned} e.m.f &= d(\Phi)/dt; &&\text{where } \Phi \text{ is the magnetic flux} \quad (1)\\ &= d(BA)/dt; &&\text{where } B \text{ is the flux density,}\\ &&&\text{and } A \text{ is the area swept by}\\ &&&\text{conductor movement}\\ &= B*d(ld)/dt; &&\text{where } l \text{ is the conductor length,}\\ &= B*l*d(d)/dt &&\text{and } d \text{ is the distance of conductor travel}\\ &= B*l*V; &&\text{where } V \text{ is the velocity of conductor}\\ &&&\text{movement} \end{aligned}$$

For a coiled conductor 204 having N turns, the above equation may be rewritten as:

$$e.m.f.=B*(N*\pi*D)*V \text{ Volts ; where } \pi*D \text{ is the perimeter of the coil} \quad (2)$$

Referring to the electromagnetic induction module 106 shown in FIG. 2, assume now that, by way of example, the permanent magnets 200, 202 each have a flux density of 1.0 Tesla, the number of times the conductor 204 winds around the rod 206 is 10,000, the diameter of the conductor coil is 2.0 mm, and the maximum velocity of the conductor coil is 0.03 meters per second. Substituting these numbers into equation (2) demonstrates that the maximum e.m.f. induced in the conductor 204 is 1.885 Volts. Such a voltage is more than sufficient to be recognized by most microcontrollers 102 as a "wake-up" or "interrupt" signal.

Any e.m.f. that is not used to wake-up the control system 102 may be used to charge the battery 108. As shown in FIG. 2, a bridge rectifier circuit 212 and capacitor (C), coupled between the electromagnetic induction module 106 and the battery 108, may be used to rectify and store the different polarities of induced e.m.f. that are generated as the conductor 204 in different directions. The charge on the capacitor may then be used to charge the battery.

To conserve maximum power, the control system 102 may re-enter a sleep state anytime the electromagnetic induction module 106 ceases to provide a sufficient wake-up voltage to the control system 102. Given that movements in the module 106 may continue after a user has stopped moving the CPD 100, the control system 102 may remain active and ready for some time after the user has stopped moving the CPD 100. To further ensure an "armed and ready" state of the CPD 100, the control system 102 may be configured to enter its sleep mode a predetermined amount of time after the electromagnetic induction module 106 ceases to generate an output signal that is sufficient to wake the control system 102.

Figure 3:
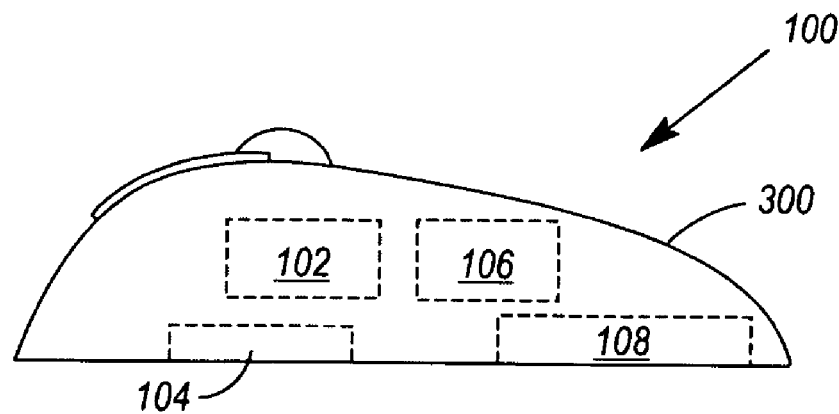
FIGS. 3 & 4 illustrate exemplary form factors for the CPD shown in FIG. 1.
Figure 4:
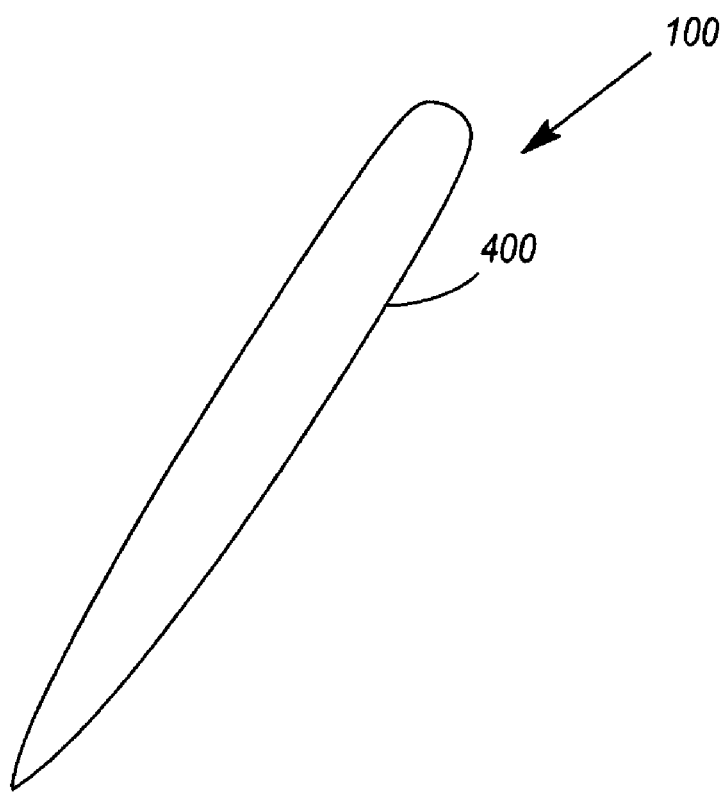

As shown in FIGS. 3 & 4, the CPD 100 may be contained within variously shaped housings 300, 400, including one that is mouse-shaped 300 (FIG. 3) or one that is pen-shaped 400 (FIG. 4). As shown, the components 102-112 of the CPD 100 are preferably enclosed within the housing 300 or 400, and are unconnected to any externally manipulable portion of the CPD 100. In this manner, none of the moving parts of the CPD 100 (and, in particular, the electromagnetic induction module 106) present themselves externally to the CPD 100, and the moving parts of the CPD 100 are sealed off from contamination.

Although the electromagnetic induction module 106 shown in FIG. 1 is used to wake a control system 102 and activate a navigation module 104 of the CPD 100, it is also contemplated that the electromagnetic induction module 106 might not be used to wake a control system 102 or activate a navigation module 104. That is, in some cases, the electromagnetic induction module 106 described herein might only be used for battery recharge purposes.

Depending on the application, the motion-driven electromagnetic induction module 106 can provide varying degrees of power conservation for a CPD 100. To a user, this may translate into fewer battery replacements, or less downtime while batteries 108 are charged in a wired or cradle environment. Although a motion-driven electromagnetic induction module 106 may be especially useful in a wireless CPD, its use is not so limited. For example, use of the electromagnetic induction module 106 in a wired device connected to a portable computer may help conserve the battery power of the portable computer.

The motion-driven electromagnetic induction module 106 can also be advantageous in that it uses no power to detect CPD movement, and it provides a more or less real-time indication of CPD activity or inactivity. Unlike capacitive wake-up sensors, a user that merely rests a hand on their CPD 100, and does not move their CPD 100, will not cause their CPD 100 to activate its navigation module 104 and drain its battery 108. And, unlike CPD's that power-cycle their optical sensors more frequently when their optical sensors acquire different image readings as a result of a focusing problem (i.e., when the CPD moves only slightly on a surface with extraordinary detail, or when the CPD senses different images as a result of not resting on a surface at all), the motion-driven electromagnetic induction module 106 disclosed herein can be used to prevent optical image acquisition except when the CPD 100 is actually moving.

What is claimed is:

1. A computer pointing device, comprising:
   a navigation module;
   an electronic control system to activate and deactivate the navigation module, the control system at times entering a sleep mode and deactivating the navigation module;
   a power supply coupled by a power supply line to a power supply input of the electronic control system to provide operating power to the electronic control system; and
   a motion-driven electromagnetic induction module that, in response to movement of the computer pointing device, generates an output signal that wakes the electronic control system and activates the navigation module, wherein the motion-driven electromagnetic induction module is configured to provide the output signal to the electronic control system at an interrupt input of the electronic control system, which is separate from the power supply input.

2. The computer pointing device of claim 1, wherein the navigation module comprises an optical sensor.

3. The computer pointing device of claim 2, wherein the navigation module further comprises a surface illumination device.

4. The computer pointing device of claim 1, further comprising a battery, coupled to the electromagnetic induction module; wherein movement of the computer pointing device causes the electromagnetic induction module to charge the battery.

5. The computer pointing device of claim 4, further comprising a bridge rectifier circuit and a capacitor, coupled between the electromagnetic induction module and the battery.

6. The computer pointing device of claim 1, wherein the electromagnetic induction module comprises at least one permanent magnet forming a magnetic field, and a conductor positioned within the magnetic field, the at least one permanent magnet and conductor being mounted to provide relative movement therebetween during movement of the computer pointing device.

7. The computer pointing device of claim 6, further comprising a rod, and one or more springs that suspend the rod in said magnetic field, the conductor being coiled about the rod.

8. The computer pointing device of claim 1, wherein the control system enters said sleep mode a predetermined amount of time after the electromagnetic induction module ceases to generate an output signal that is recognizable by the electronic control system to wake the electronic control system.

9. The computer pointing device of claim 1, further comprising a housing, wherein the electromagnetic induction module is fully enclosed within the housing.

10. The computer pointing device of claim 1, further comprising a mouse-shaped housing to which said navigation module, control system and electromagnetic induction module are mounted.

11. The computer pointing device of claim 1, further comprising a pen-shaped housing to which said navigation module, control system and electromagnetic induction module are mounted.

12. The computer pointing device of claim 1, wherein the power supply coupled to the electronic control system comprises an internal battery within the computer pointing device.

13. The computer pointing device of claim 1, wherein the power supply coupled to the electronic control system comprises an external power source connected to the computer pointing device.

* * * * *